United States Patent [19]
Davis

[11] Patent Number: 5,949,881
[45] Date of Patent: *Sep. 7, 1999

[54] APPARATUS AND METHOD FOR CRYPTOGRAPHIC COMPANION IMPRINTING

[75] Inventor: Derek L. Davis, Phoenix, Ariz.

[73] Assignee: Intel Corporation, Santa Clara, Calif.

[ * ] Notice: This patent issued on a continued prosecution application filed under 37 CFR 1.53(d), and is subject to the twenty year patent term provisions of 35 U.S.C. 154(a)(2).

[21] Appl. No.: 08/566,910

[22] Filed: Dec. 4, 1995

[51] Int. Cl.⁶ .............................. H04K 1/00; H04L 9/00
[52] U.S. Cl. .................................. 380/25; 380/23; 380/49
[58] Field of Search .................................. 380/23, 25, 49

[56] References Cited

U.S. PATENT DOCUMENTS

| | | |
|---|---|---|
| 4,215,421 | 7/1980 | Giraud . |
| 4,310,720 | 1/1982 | Check, Jr. . |
| 4,471,216 | 9/1984 | Herve . |
| 4,544,833 | 10/1985 | Ugon . |
| 4,549,075 | 10/1985 | Saada et al. . |
| 4,558,176 | 12/1985 | Arnold et al. . |
| 4,638,120 | 1/1987 | Herve . |
| 4,656,342 | 4/1987 | Ugon . |
| 4,656,474 | 4/1987 | Mollier et al. . |
| 4,658,093 | 4/1987 | Hellman . |
| 4,807,288 | 2/1989 | Ugon et al. . |
| 4,811,393 | 3/1989 | Hazard . |
| 4,825,052 | 4/1989 | Chemin et al. . |
| 4,907,270 | 3/1990 | Hazard . |
| 4,907,272 | 3/1990 | Hazard et al. . |
| 4,910,774 | 3/1990 | Barakat . |
| 5,020,105 | 5/1991 | Rosen et al. .............................. 380/23 |
| 5,068,894 | 11/1991 | Hoppe . |
| 5,144,667 | 9/1992 | Pogue, Jr. et al. ........................ 380/25 |
| 5,153,581 | 10/1992 | Hazard . |
| 5,191,611 | 3/1993 | Lang ........................................ 380/25 |
| 5,214,702 | 5/1993 | Fischer . |
| 5,327,497 | 7/1994 | Mooney et al. ........................... 380/25 |
| 5,396,609 | 3/1995 | Schmidt et al. . |
| 5,422,953 | 6/1995 | Fischer . |
| 5,473,692 | 12/1995 | Davis . |
| 5,481,611 | 1/1996 | Owens et al. .............................. 380/25 |
| 5,499,295 | 3/1996 | Cooper . |
| 5,539,828 | 7/1996 | Davis . |
| 5,546,463 | 8/1996 | Caputo et al. ............................. 380/25 |
| 5,568,552 | 10/1996 | Davis . |
| 5,615,263 | 3/1997 | Takahashi . |
| 5,796,840 | 8/1998 | Davis . |
| 5,805,712 | 9/1998 | Davis . |

OTHER PUBLICATIONS

1989 Conference on VLSI and Computer Peripherals, IEEE Computer Society Press, 1989, pp. 4/155–4/158.

*Primary Examiner*—Stephen C. Buczinski
*Attorney, Agent, or Firm*—Blakely, Sokoloff, Taylor & Zafman

[57] ABSTRACT

A mechanism to conditionally activate an electronic device implemented within electronic computing equipment such as a computer. Such activation may be based on user authentication and/or confirmation that the electronic device is operating in conjunction with its companion cryptographic device.

18 Claims, 4 Drawing Sheets

APPARATUS AND METHOD FOR CRYPTOGRAPHIC COMPANION IMPRINTING

BACKGROUND OF THE INVENTION

Field of the Invention

The present invention relates to the field of cryptography. More particularly, the present invention relates to a method and apparatus for altering an operational state of an electronic device of a node such as by electronically imprinting that electronic device and its "companion" electronic device with a shared secret so that each electronic device will operate only in conjunction with its "companion".

Description of Art Related to the Invention

In recent years, it is becoming increasingly desirable to transmit digital information between at least two nodes, defined as any electronic computing equipment such as computer or any peripheral, in a manner which is clear and unambiguous to authorized operators of these nodes, but otherwise incomprehensible to any unauthorized recipients. This can be accomplished by both nodes performing cryptographic operations, such as encryption and decryption, on the digital information. Often, these cryptographic operations are performed by software applications executing algorithms of well-known cryptographic techniques including, but not limited to symmetric key cryptography, asymmetric (or public) key cryptography or any combination of these cryptographic techniques. These cryptographic techniques are disclosed in a previously filed patent application entitled "KEY CACHE SECURITY SYSTEM" by Derek L. Davis filed Dec. 29, 1994 (application Ser. No. 08/365,347) which was assigned to Assignee of the present Application.

The advantages of using a hardware-based cryptographic coprocessor in the node as presented in U.S. Pat. Nos. 5,539,838, 5,805,712, and 5,796,840 is recognized both for its superior performance over a software implementation of cryptographic operations and for the higher security of "key material" used in those cryptographic operations. Unrelated to these technological developments is the social problem of electronic hardware theft, particularly theft of laptop computers. Such thefts are motivated by both the high value of laptop computers and by the potential value of the information contained within these laptops, such as business plans, marketing information, pricing information etc. Use of a hardware-based cryptographic coprocessor clearly would help prevent the loss of such confidential information, but does little to deter the theft since the laptop computer itself is of significant value.

Therefore, it would be advantageous to implement a mechanism which would reduce the value of such a laptop computer in the event of its theft or loss and thus, in effect, would deter such theft and encourage its return in the event of loss. Specifically, it would be desirable to be able to cause a source device (e.g., a system processor) to become non-functional for all but the authorized user(s) of the laptop computer and/or if two electronic devices are separated.

BRIEF SUMMARY OF THE INVENTION

Based on the foregoing, it would be desirable to develop and implement an electronic mechanism within a node like a laptop computer such that a source device and its companion cryptographic device are "bound" together and neither will operate in the absence of the other. The electronic keying mechanism provides a trusted communication path between the cryptographic device and its source device, namely an empowerment unit which can function even when the source device is in a non-functional state. This trusted communication path is used for mutual authentication of these two devices. Electronic keying requires that both the source device and the cryptographic device are embedded with a node-specific shared secret.

BRIEF DESCRIPTION OF THE DRAWINGS

The features and advantages of the present invention will become apparent from the following detailed description of the present invention in which.

DESCRIPTION OF THE PREFERRED EMBODIMENT

The preferred embodiment of the present invention relates to a source device and its companion cryptographic device implemented within a node wherein each device is electronically keyed together (i.e., imprinted) with a node-specific shared secret. For the scope of this application, a "shared secret" (or otherwise referred to as a "device identification") is an unique bit representation, preferably unknown by any entity or shared with any device other than the source device and its companion cryptographic device.

In the following description, numerous details are set forth including certain components of the source device and/or cryptographic device and illustrative steps of a method by which the shared secret is electronically keyed within the source and cryptographic devices. It will be obvious, however, to one skilled in the art that these details are not required to practice the present invention. In other instances, well known circuits, elements and system configurations are not set forth in detail in order to avoid unnecessarily obscuring the present invention.

Terminology used to describe certain cryptography-related functions is defined herein. A "key" is an encoding and/or decoding parameter used by conventional cryptographic algorithms such as Rivest, Shamir and Adleman ("RSA"), Data Encryption Algorithm ("DES") and the like. More specifically, the key is a sequential distribution of binary data of an arbitrary length (i.e., data string). A "message" is generally defined as information (e.g., data, address, keys or any other information) being transferred in one or more bus cycles. Two common types of messages are an authorization message (e.g., a "challenge") and a return message (i.e., a "response").

Figure 1:
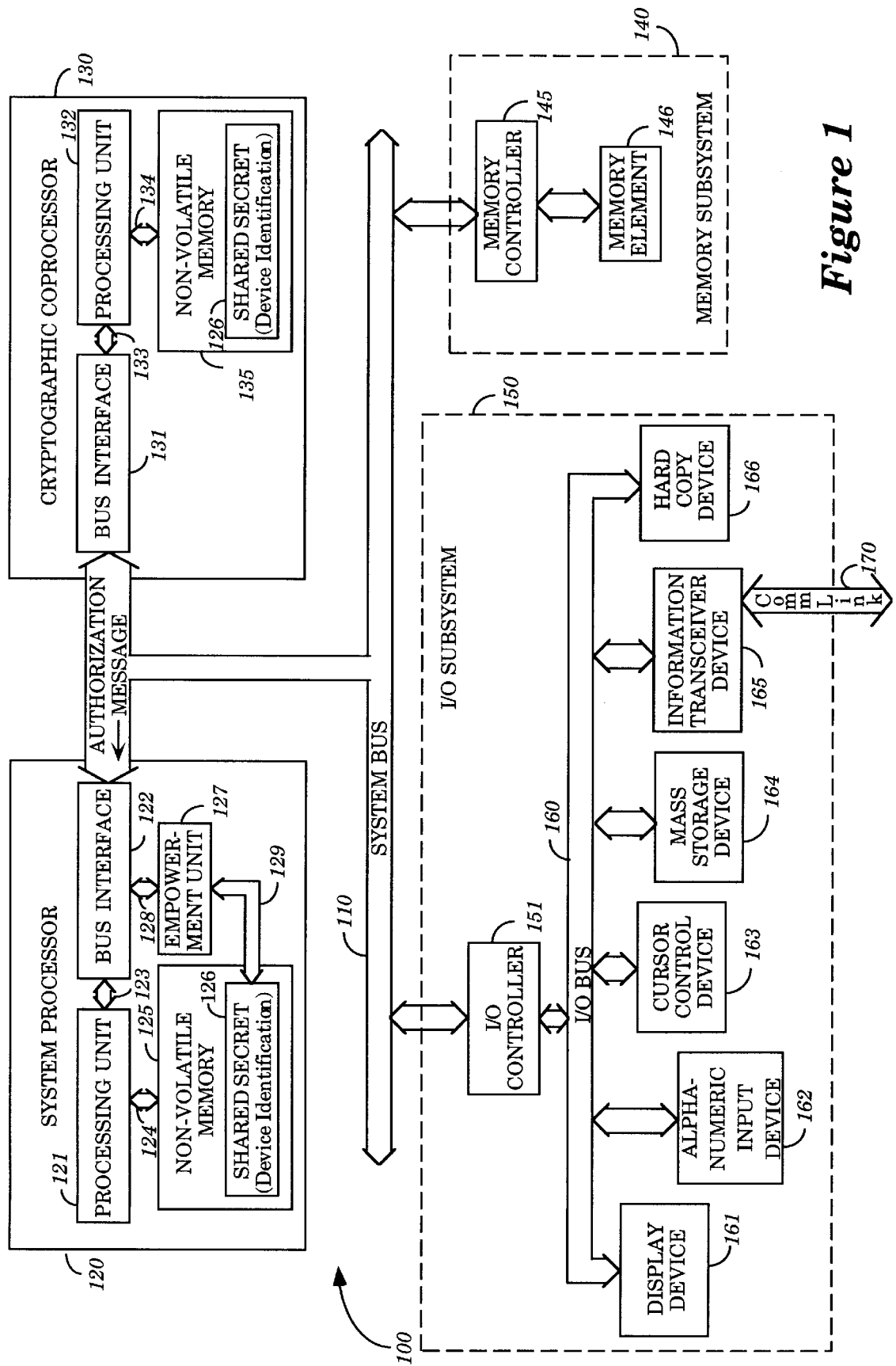
FIG. 1 is a block diagram of an illustrative embodiment of a node incorporating a cryptographic device which performs security-sensitive operation(s) to insure that a source device of the node is non-functional unless a user of the node is authenticated and the source device of the node is operating in combination with its companion cryptographic device.
Figure 2:
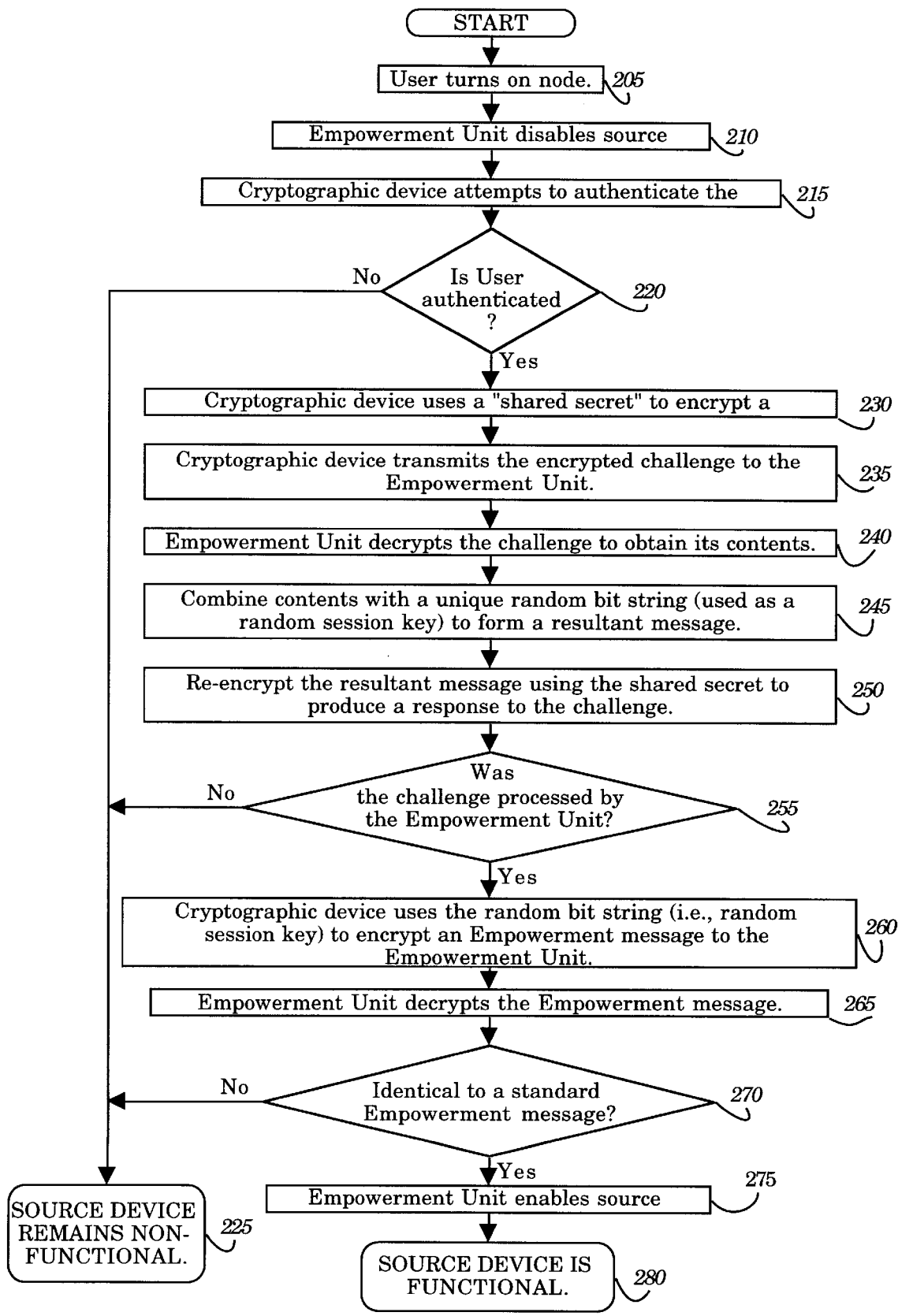
FIG. 2 is an illustrative flowchart of the operations of the node of FIG. 1 in an attempt to authenticate the user and guarantee that both devices are operational.

As shown in FIGS. 1 and 2, "imprinting" both the source device and the cryptographic device together, which are shown as a system processor and a cryptographic coprocessor respectively, allows the cryptographic coprocessor to be used as the user-authenticator for the node. Since the cryptographic coprocessor executes "trusted" firmware that is difficult to tamper with, it can perform the required user authentication functions without significant risk of being "tricked". This approach is preferable over using the system processor itself to perform such authentications because the system processor runs software that can be easily tampered with by someone skilled in computer hardware and software manipulation. Once such authentication is completed, an encrypted message is passed from the cryptographic coprocessor to the system processor, giving it "authorization" to operate. Preferably, this message would be encrypted under a temporary session key to prevent "replay" of such previous messages although the use of the temporary encryption key is not necessary.

Referring now to FIG. 1, an illustrative embodiment of a node 100 comprising a system bus 110 coupling together a plurality of bus agents, including, but not limited to a source device 120, a cryptographic device 130, a memory subsystem 140 and an input/output ("I/O") subsystem 150 is shown. The source device 120 (e.g., a system processor) is electronically keyed to the cryptographic device 130 (e.g., a cryptographic coprocessor) in order to provide secured bi-directional communications between the system processor 120 and the cryptographic coprocessor 130. It is contemplated, however, that other "source" devices besides the system processor (e.g., hard disk controller, video display controller and the like) may alternatively be electronically keyed to the cryptographic coprocessor 130.

As shown, the system processor 120 includes at least one internal processing unit 121 (e.g., a processor core for an 'X86 Intel® Microprocessor Architecture), a bus interface 122, non-volatile memory 125 and an empowerment unit 127. The internal processing unit 121 is coupled to the bus interface 122 and the non-volatile memory 125 through bi-directional information buses 123 and 124, respectively. A first information bus 123 enables the internal processing unit 121 of the system processor 120 to receive information from and transmit information to various bus agents. A second information bus 124 enables information from the non-volatile memory 125 to be fetched by the internal processing unit 121 for execution with various cryptographic algorithms. Both the information buses 123 and 124 have arbitrary bit widths.

The empowerment unit 127 is coupled to the bus interface 122 and the non-volatile memory 125 through bi-directional information buses 128 and 129, respectively. In this embodiment, the empowerment unit 127 is an "encryption/decryption engine" such as a processor having a fixed functionality as described below. The empowerment unit 127 enables the system processor 120 to exchange messages with the cryptographic coprocessor 130 without evoking any operations by the internal processing unit 121 so that it can remain in its non-functional state after power-up. It is contemplated that the empowerment unit 127 may further include a random number generator to produce a temporary session key described below.

The non-volatile memory 125 of the system processor 120 stores at least a "shared secret" (or "device identification") 126 which is a predetermined, unique bit representation used by the empowerment unit 127 as a permanent cryptographic key for encrypting and decrypting messages exchanged with the cryptographic coprocessor 130. The non-volatile memory 125 is preferably flash memory but may include any type of erasable programmable read-only memory ("EPROM") like EPROM, flash EPROM, EEPROM, etc.

The cryptographic coprocessor 130, a bus interface 131, at least one internal, dedicated processing unit 132 and non-volatile memory 134. The dedicated processing unit 132 is coupled to the bus interface 131 and the non-volatile memory 134 through bi-directional information buses 133 and 134, respectively. The non-volatile memory 134 of the cryptographic coprocessor 130 contains at least the same "shared secret" 126.

The system bus 110 enables the system processor 120 and cryptographic processor 130 to communicate as well as provides access to the memory subsystem 140 and the input/output ("I/O") subsystem 150. The memory subsystem 140 includes a memory controller 145 coupled to the system bus 110 to provide an interface for controlling access to at least one memory element 146 such as dynamic random access memory ("DRAM"), read only memory ("ROM"), video random access memory ("VRAM") and the like. The memory element 146 stores information and instructions for use by the internal processing unit 121.

The I/O subsystem 150 includes an I/O controller 151 which operates as an interface between the system bus 110 and a conventional I/O bus 160. This provides a communication path (i.e., gateway) to allow devices on the system bus 110 and the I/O bus 160 to exchange information. The I/O bus 160 allows information to propagate to at least one peripheral device in the node 100 including, but not limited to a display device 161 (e.g., cathode ray tube, liquid crystal display and/or flat panel display and its corresponding controller) for displaying images; an alphanumeric input device 162 (e.g., an alphanumeric keyboard, etc.) for communicating information and command selections to the internal processing unit 121; a cursor control device 163 (e.g., a mouse, trackball, joy stick, touch pad, etc.) for controlling cursor movement; a mass storage device 164 (e.g., magnetic tapes, hard disk drive and/or floppy disk drive and its corresponding controller) for storing information and instructions; an information transceiver device 165 (fax machine, modem, scanner, etc.) for transmitting information from the node 100 to an external system or device and for receiving information from an external source via a communication link 170; and a hard copy device 166 (e.g., plotter, printer, etc.) for providing a tangible, visual representation of the information. It is contemplated that the node 100 shown in FIG. 1 may employ some or all of these components or different components than those illustrated.

Referring now to FIG. 2, a flowchart illustrating one technique for enabling the system processor of FIG. 1 after user verification (or authentication) and companion confirmation is shown. It is contemplated that the user verification and companion confirmation operations may be mutually exclusive. At block 205, the presumably authorized user supplies power to the node such as, for example, a laptop computer. At this point, the empowerment unit of the system processor actively disables the internal processing unit (i.e., places the system processor in a non-functional state) by performing one of many possible disabling operations (block 210). For example, the disabling operation may involve preventing power and/or clocking signals from being supplied to the internal processing unit, providing a constant RESET signal to the internal processing unit, providing a continuous series of "NO-OP" instructions for execution by the internal processing unit and the like.

At blocks 215–220, the cryptographic coprocessor attempts to verify that an authorized user is present. This can be accomplished through a number of ways, including checking a Personal Identification Number ("PIN") or a password, interrogating a user supplied authentication token such as a smart card or PCMCIA card, or using biometric measurements (such as retinal scan, fingerprint, iris scan, hand geometry, etc.). The system processor is not involved in this user verification process since it executes externally supplied software that is easily modified.

If the user verification operation is not successful, the system processor and thus the laptop computer itself remains non-functional (block 225). However, if the user verification operation is successful, the companion confirmation operation is performed. In this embodiment, the cryptographic device uses its internally stored "shared secret" to encrypt a challenge and transmits the encrypted challenge to the empowerment unit of the source device (blocks 230–235). The challenge is a random bit string which is unique to each attempt to turn-on the laptop computer.

In block 240, this challenge is decrypted by the empowerment unit to determine the contents of the challenge. The contents of the challenge are then combined with another random bit string, which is newly generated for each challenge received, in order to form a resultant message (block 245). Thereafter, the resultant message is re-encrypted under the "shared secret" contained in memory accessible to the empowerment unit to create a response which is sent back to the cryptographic device (block 250). In block 255, the cryptographic device decrypts the response with the "shared secret" to verify that the response was processed by the empowerment unit. If the response was not produced by the empowerment unit but instead by another processor or by an external source, the laptop computer remains disabled (block 225); otherwise, the random bit string received from the empowerment unit is used as a temporary session key by the cryptographic processor to encrypt an "authorization message" and that message is sent to the source device's empowerment unit (block 250). In blocks 265–270, the empowerment unit decrypts the authorization message and compares this to a standard, predetermined authorization message (a message indicating that user verification and companion confirmation was successful). If these messages do not compare, the system processor as well as the laptop computer remains non-functional (block 225); otherwise, the empowerment unit enables the internal processing unit of the system processor and the laptop computer now becomes completely functional (blocks 275–280).

Figure 3:
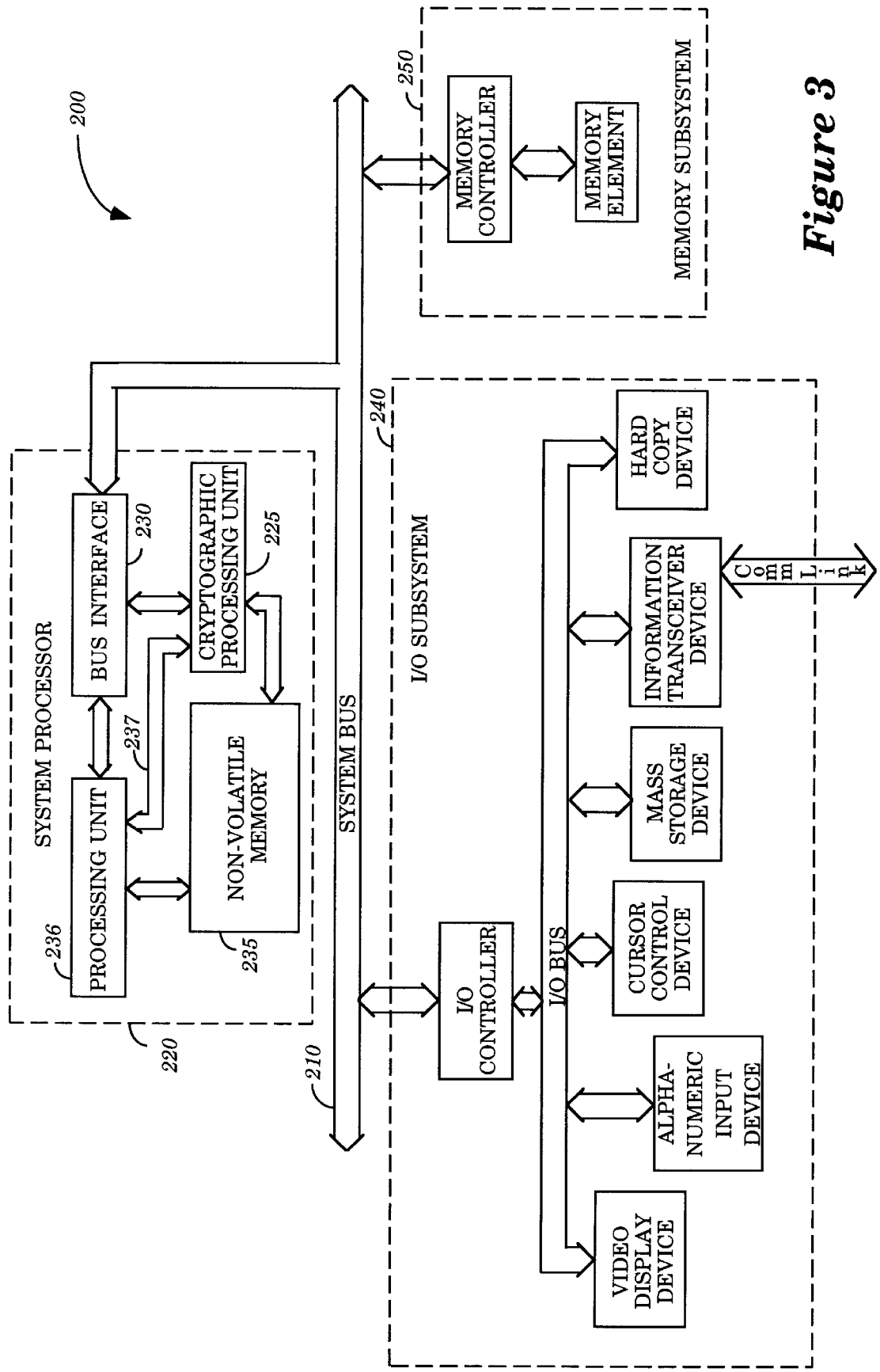
FIG. 3 is a block diagram of an alternative embodiment of a node incorporating a system processor having an internal cryptographic processing unit dedicated to cryptographic operations to guarantee that its processor core is non-functional if the user is not authenticated.

Referring now to FIG. 3, an alternative embodiment of a node 200 employing a system processor 220 as well as memory and I/O subsystems 240 and 250 coupled to a system bus 210 is shown. In this embodiment, no imprinting is required since a cryptographic processing unit 225 is employed in the same silicon as the system processor rather than as an independent component or a separate die in the same semiconductor package. Instead, the cryptographic processing unit 225 is used to maintain the system processor 220 in a non-functional state until its user is authenticated.

As shown, the dedicated cryptographic processing unit 225 is employed within the system processor 220 to preclude the system processor from functioning absent user authentication. The cryptographic processing unit 225 is coupled to (i) a bus interface unit 230 which receives information from the system bus 210, (ii) non-volatile memory 235 which contains needed cryptographic information and (iii) an internal processing unit 236 which executes instructions. The cryptographic processing unit 225 is coupled to the internal processing unit 236 via control signal line(s) 237 to control the operational state of the system processor 220. For example, the internal processing unit 236 may be non-functional until the cryptographic processing unit 225 asserts the control signal line(s) 237.

Figure 4:
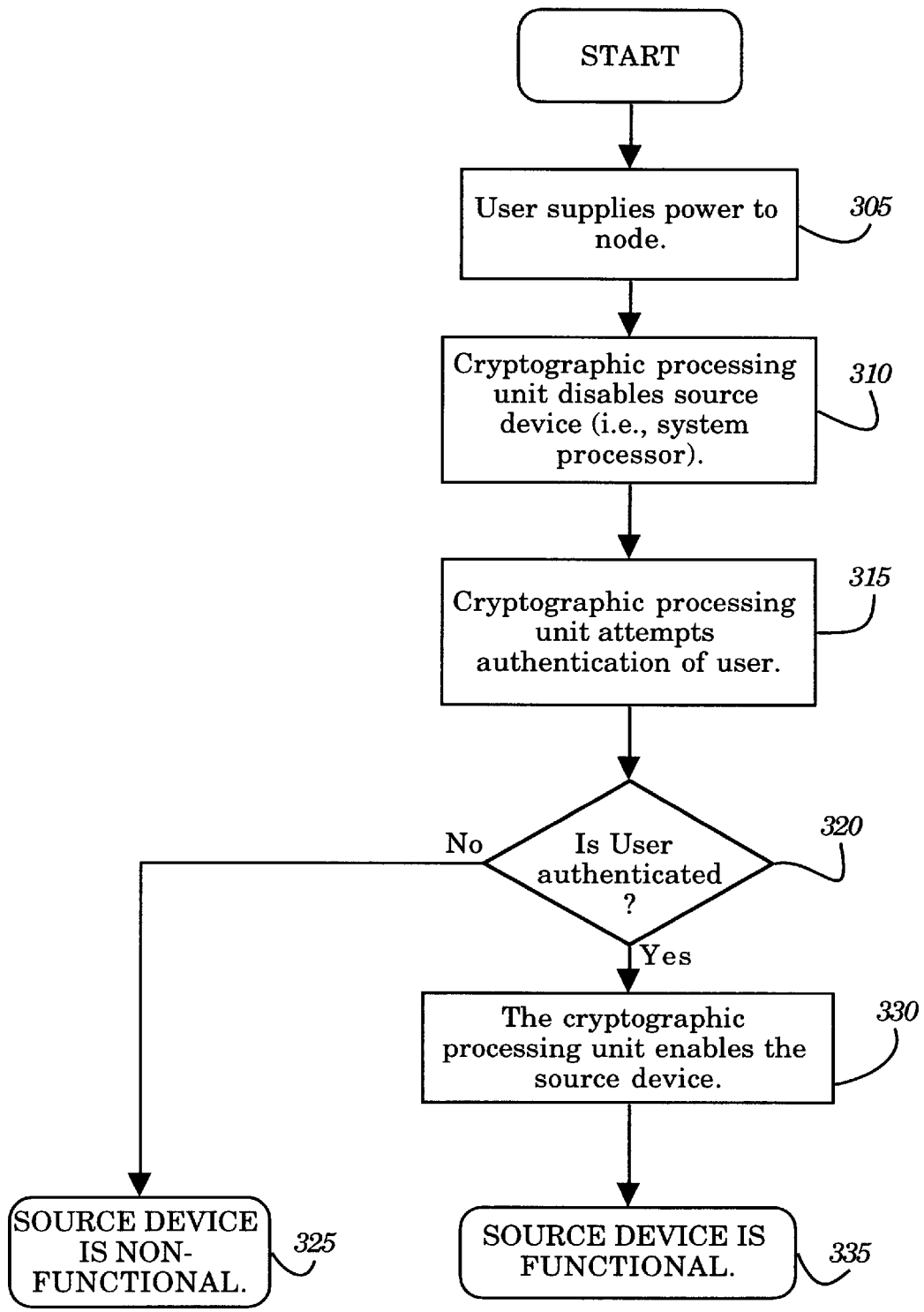
FIG. 4 is an illustrative flowchart of the operations of the node of FIG. 3 in an attempt to authenticate the user.

Referring to FIG. 4, the operational state of the node of FIG. 3 is controlled as shown. At block 305, the presumably authorized user supplies power to the laptop computer. At this point, in block 310, the cryptographic processing unit employed within the system processor actively disables the internal processing unit by performing one of many possible disabling operations as discussed in block 210 of FIG. 2. Next, in blocks 315–320 the cryptographic processing unit attempts to verify that an authorized user is present through such techniques as checking a PIN or a password, interrogating a user supplied authentication token (e.g., a smart card or PCMCIA card), or using biometric measurements (e.g., scan).

If the verification is not successful, the node remains non-functional (block 325). However, if the verification step is successful, the cryptographic processing unit enables the system processor by asserting its control signal line (block 330). This allows the internal processing unit to execute instructions so that the node is functional (block 335).

The present invention described herein may be designed in many different methods and using many different configurations. While the present invention has been described in terms of various embodiments, other embodiments may come to mind to those skilled in the art without departing from the spirit and scope of the present invention. The invention should, therefore, be measured in terms of the claims which follows.

What is claimed is:

1. A node comprising:
    a system processor including:
        a semiconductor package,
        a processor core contained in the semiconductor package and initially placed in a non-functional state, and
        an empowerment unit contained in the semiconductor package and coupled to the processor core, the empowerment unit placing the processor core into a functional state where the processor core is operative upon receiving an encrypted, authorization message; and
    a cryptographic device coupled to the empowerment unit of the system processor, the cryptographic device including a processing unit transmitting the authorization message to the empowerment unit in order to place the processor core in the functional state after confirming that the cryptographic device is in communication with the system processor.

2. The node according to claim 1, wherein the processor core of the system processor is placed in the functional state by deactivating a reset signal provided to the system processor, the reset signal continuously being active while the system processor is in the non-functional state.

3. The node according to claim 2, wherein the cryptographic device includes a coprocessor.

4. The node according to claim 1, wherein the cryptographic device places the processor core of the system processor in the functional state by signaling the empowerment unit to allow power to be supplied to the processor core.

5. The node according to claim 1, wherein the system processor includes a random number generator to generate a temporary session key to be used between the cryptographic device and the system processor after verification that the cryptographic device is in communication with the empowerment unit of the system processor.

6. A node requiring authentication of its user to be functional, the node comprising:
    a bus; and a system processor coupled to the bus, the system processor including
a semiconductor package,
a processor core contained in the semiconductor package, the processor core being initially placed in a non-functional state, and
a cryptographic processing unit coupled to at least the processor core and contained in the semiconductor package, the cryptographic processing unit placing the processor core in a functional state upon establishing that the cryptographic processing unit is in communication with the processor core.

7. The node of claim 6, wherein in the non-functional state, the processor core is maintained in a reset state.

8. A method for conditionally activating an integrated circuit device implemented in a node along with a companion device, the method comprising:
powering up the node;
disabling the integrated circuit device at power up of the node to prevent the integrated circuit device from processing digital information, the integrated circuit device permanently containing a device identification;
verifying that a user of the node is authorized to use the node;
confirming that the integrated circuit device is operating in conjunction with the companion device, the companion device permanently containing the device identification; and
enabling the integrated circuit device if the user is verified and the integrated circuit device is confirmed to be operating in conjunction with the companion device.

9. The method according to claim 8, wherein the confirming that the integrated circuit is operating in conjunction with the companion device includes
encrypting a challenge using the device identification contained in the companion device;
transmitting the encrypted challenge to the integrated circuit device;
receiving the encrypted challenge by the integrated circuit device;
decrypting the encrypted challenge with the device identification contained in the integrated circuit device;
encrypting a response to the challenge using the device identification contained in the integrated circuit device;
transmitting the encrypted response from the integrated circuit device to the companion device; and
decrypting the response thereby determining that the integrated circuit device and the companion device are operating in conjunction with each other.

10. The method according to claim 9, wherein the response produced by the integrated circuit device includes contents of the challenge produced by the companion device and a random bit string.

11. A computer comprising:
a system processor including:
a semiconductor package,
a processor core contained in the semiconductor package, and
an empowerment unit contained in the semiconductor package and coupled to the processor core, the empowerment unit controlling an operating state of the processor core by (i) placing the processor core in a non-functional state in response to a first event so that the processor core is inoperative, and alternatively (ii) placing the processor core in a functional state in response to a second event; and
a cryptographic device coupled to the system processor, the cryptographic device signaling the empowerment unit to place the processor core in the functional state.

12. The computer according to claim 11, wherein the first event includes initial power-up of the computer.

13. The computer according to claim 12, wherein the second event includes confirmation that the cryptographic device is in communication with the system processor.

14. The computer according to claim 13, wherein the second event further includes authentication of a user of the computer.

15. The computer according to claim 11, wherein the cryptographic device signals the empowerment unit to discontinue providing NO OPERATION instructions for execution by the system processor so as to control the operating state of the system processor.

16. The computer according to claim 11, wherein the cryptographic device signals the empowerment unit to allow power to be supplied to the processor core of the system processor so as to control the operating state of the system processor.

17. The computer according to claim 11, wherein the cryptographic device signals the empowerment unit to deactivate a reset signal supplied to the processor core of the system processor so as to control the operating state of the system processor.

18. A computer comprising:
a semiconductor device package;
processing means contained in the semiconductor device package for processing digital information, the processing means being initially placed in a non-functional state after power is applied thereto; and
cryptographic means for placing the processing means in a functional state after verifying that the cryptographic means is in communication with the processor means, the cryptographic means being contained in the semiconductor device package.

* * * * *